US008798854B2

(12) United States Patent
Sakakibara

(10) Patent No.: US 8,798,854 B2
(45) Date of Patent: Aug. 5, 2014

(54) DATA RECORDER

(75) Inventor: Tadaaki Sakakibara, Kariya (JP)

(73) Assignee: Denso Corporation, Kariya (JP)

( * ) Notice: Subject to any disclaimer, the term of this patent is extended or adjusted under 35 U.S.C. 154(b) by 110 days.

(21) Appl. No.: 13/485,964

(22) Filed: Jun. 1, 2012

(65) Prior Publication Data

US 2012/0310474 A1 Dec. 6, 2012

(30) Foreign Application Priority Data

Jun. 3, 2011 (JP) ................................ 2011-125515

(51) Int. Cl.
*G01M 17/00* (2006.01)
*G07C 5/08* (2006.01)

(52) U.S. Cl.
CPC ..................................... *G07C 5/085* (2013.01)
USPC ......................... 701/33.4; 701/33.5; 701/34.4

(58) Field of Classification Search
USPC ...................................... 701/33.4, 33.5, 34.4
See application file for complete search history.

(56) References Cited

U.S. PATENT DOCUMENTS

| | | | |
|---|---|---|---|
| 7,079,927 | B1 | 7/2006 | Tano et al. |
| 2009/0037044 | A1 | 2/2009 | Enomoto et al. |

FOREIGN PATENT DOCUMENTS

| | | |
|---|---|---|
| JP | 10-201002 | 7/1998 |
| JP | 2001-182607 | 7/2001 |
| JP | 2004-318912 | 11/2004 |

*Primary Examiner* — Calvin Cheung
*Assistant Examiner* — Basil T Jos
(74) *Attorney, Agent, or Firm* — Nixon & Vanderhye PC

(57) ABSTRACT

A data recorder mounted to a vehicle is disclosed. When detecting a specific behavior of the vehicle, the data recorder determines whether or not a presently-occurring failure detected by a failure detector of the vehicle is a cause of occurrence of the specific behavior. When the presently-occurring failure is not the cause of occurrence of the specific behavior, the data recorder is permitted to record a control data in a non-volatile data storage device. When the presently-occurring failure is the cause of occurrence of the specific behavior, the record processing device is prohibited from recording the control data in the non-volatile data storage device.

14 Claims, 7 Drawing Sheets

FIG. 3

[FAIL. TYPE INFO.]

(※)NE: NOMBER OF ENGINE REV.

| BEH. | BEH.-INDUCIBLE FAIL. | | | |
|---|---|---|---|---|
| NE SUDDEN INCREASE | THROTTLE ABNL | ACCEL. ABNL | NE-SIG. LINE ABNL | EGR ABL |
| SUDDEN ACCELERATE | THROTTLE ABNL | ACCEL. ABNL | NE-SIG. LINE ABNL | EGR ABL |
| SUDDEN DECELERATE | THROTTLE ABNL | NE-SIG. LINE ABNL | MISFIRE ABNL | |
| ...... | ...... | ...... | ...... | ...... |
| PRESSING OF BOTH ACCEL. AND BRAKE | ACCEL. ABNL | BRAKE ABNL | | |

DATA RECORDER

CROSS REFERENCE TO RELATED APPLICATION

The present application is based on and claims priority to Japanese Patent Application No. 2011-125515 filed on Jun. 3, 2011, disclosure of which is incorporated herein by reference.

TECHNICAL FIELD

The present disclosure relates to a data recorder for a vehicle.

BACKGROUND

A known data recorder detects a specific behavior of a vehicle and records a control data of the vehicle at a time of detecting the specific behavior in a data-writable non-volatile memory. In this data recorder, the specific behavior is a behavior that can occur in conjunction with a driver's operation of the vehicle (see Patent Document 1). According to this kind of data recorder, analysis of the control data stored in the non-volatile memory enables a detailed investigation of a cause of occurrence of the specific behavior.

In the data recorder, when it is determined that a detection condition for a preset behavior is satisfied, the data recorder determines that the preset behavior has occurred. Patent Document 1 proposes that the detection condition be dynamically set (i.e., changed) in accordance with a vehicle traveling environment, an operator (driver) identification information, or an operator history information such as a driving skill, accident history and the like.

By the way, an electronic control unit for controlling a vehicle engine or the like is equipped with a failure detection function called also a diagnostic function. The failure detection function diagnoses a variety of failures based on information from in-vehicle equipment such as a sensor and the like in order to determine whether or not a failure has occurred. When determining that a failure has occurred, the failure detection function records a failure information (also called "Diagnostic Trouble Code" (DTC)) indicating the occurrence of the failure in a data-writable non-volatile memory. For this kind of electronic control unit, see Patent Document 2.

Patent Document 1: JP2000-185676A1 corresponding to U.S. Pat. No. 7,079,927B2

Patent Document 2: JP 2009-59334A1 corresponding to US 2009/0037044A1

In relation to the above, the inventor of the present application has found out the following. When a technique of changing the detection condition for a specific behavior of Patent Document 1 is applied to the data recorder, unneeded detection of a specific behavior can be reduced, and consequently, a storage resource for storing control data can be saved.

However, regardless of whether the technique is applied or not applied, upon detecting a specific behavior, a conventional data recorder records a control data of the vehicle without taking into account a cause of occurrence of the detected behavior. Therefore, even in cases where a detected specific behavior is a behavior occurring in conjunction with a failure of the vehicle, the control data is recorded. The storage resource is uselessly consumed.

For example, a "sudden increase in engine revolution" may be set as a specific behavior to be detected. In this case, even if the engine revolution suddenly increases due to a vehicle throttle failure, the data recorder detects the sudden increase in engine revolution and records the control data at the time of detection in the non-volatile memory. Additionally, the above-described failure detection function of the electronic control unit of the vehicle also records the failure information indicating the throttle failure. From the stored failure information, it is possible to recognize that the throttle failure is a cause of the sudden increase in engine revolution. Therefore, the cause of the sudden increase in engine revolution can be identified without the investigation of the control data recorded by the data recorder. The control data is a useless data in this case.

As can been seen, the data recorder records a practically-useless control data, which is a control data recorded at a time of the detection of a specific behavior whose cause can be identified from the failure information reordered by the failure detection function. This results in large consumption of the storage resource for control data. Therefore, it is difficult to secure a storage area for a control data that is really to be recorded.

SUMMARY

In view of the foregoing, it is an object of the present disclosure to provide a data recorder that can prevent a useless control data from being recorded.

According to one example of the present disclosure, a data recorder mounted to a vehicle together with a failure detector is provided. The failure detector is configured to (i) make, for multiple types of failure, a determination of whether or not a failure is occurring, and (ii) record failure information indicating an occurrence of the failure in a failure information storage unit upon determining that the failure is occurring. The data recorder comprises a behavior detection device, a record processing device, and a cause determination device. The behavior detection device detects a specific behavior of the vehicle. The specific behavior is defined as a behavior that can occur in conjunction with a driver's operation of the vehicle. The record processing device records a predetermined control data of the vehicle in a non-volatile data storage device when the behavior detection device detects the specific behavior of the vehicle. The cause determination device determines, in response to detection of the specific behavior by the behavior detection device, whether or not a presently-occurring failure is a cause of occurrence of the specific behavior. The presently-occurring failure is the failure that is occurring according to a result of the determination made by the failure detector. When the cause determination device determines that the presently-occurring failure is not the cause of occurrence of the specific behavior, the record processing device is permitted to record the control data in the non-volatile data storage device. When the cause determination device determines that the presently-occurring failure is the cause of occurrence of the specific behavior, the record processing device is prohibited from recording the control data in the non-volatile data storage device.

According to the above data recorder, it is possible to prevent a useless control data from being recorded.

BRIEF DESCRIPTION OF THE DRAWINGS

The above and other objects, features and advantages of the present disclosure will become more apparent from the following detailed description made with reference to the accompanying drawings. In the drawings:

FIG. 3 is a diagram illustrating failure type information in which behavior-inducible failures are stored in association with each type of behavior to be detected;

DETAILED DESCRIPTION

An in-vehicle communication system including a data recorder will be described below.

First Embodiment

Figure 1:
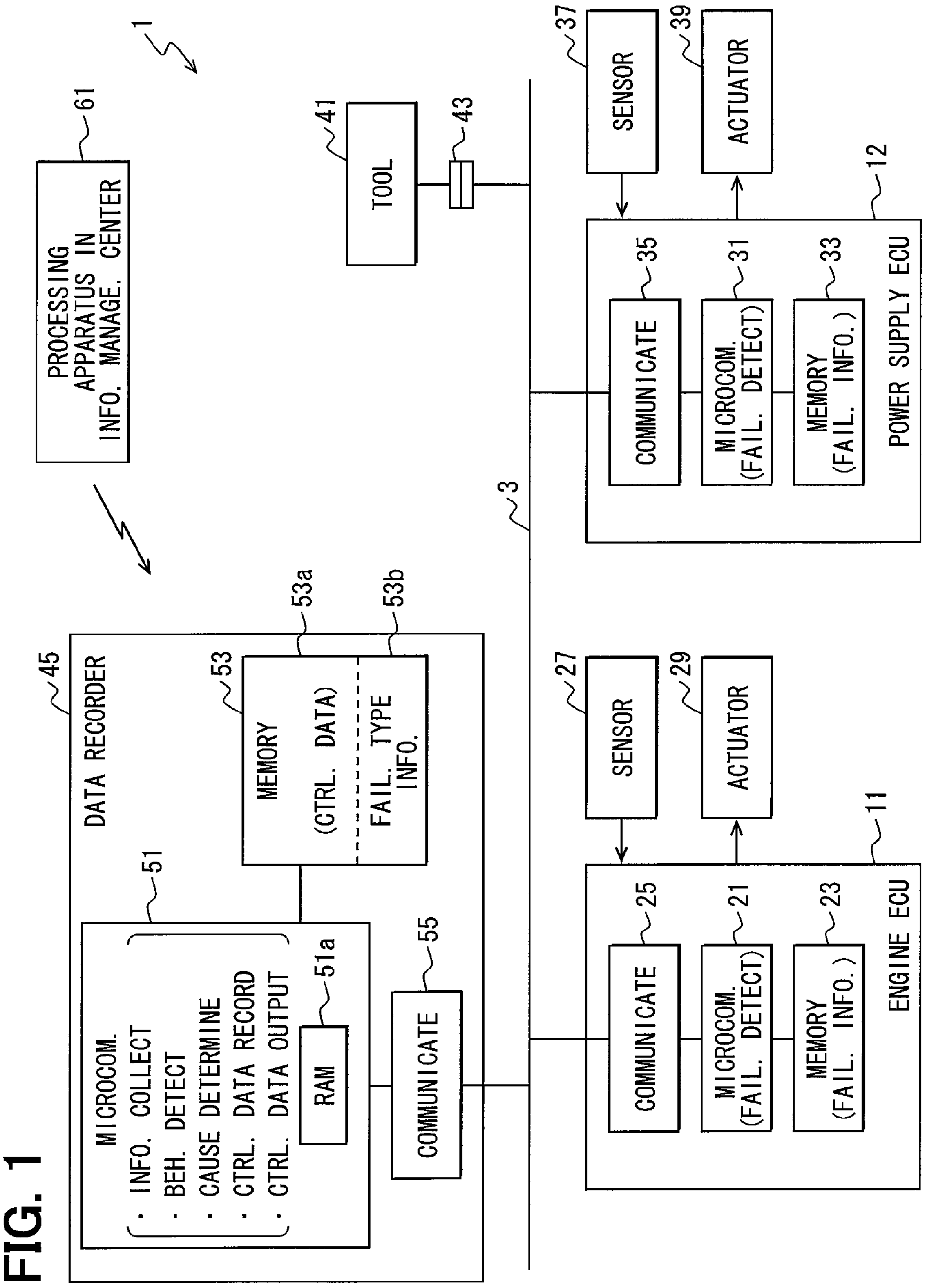
FIG. 1 is a diagram illustrating an in-vehicle communication system including a data recorder.

As shown in FIG. 1, an in-vehicle communication system 1 of the present embodiment includes multiple electronic control units (ECUs) 11, 12. The ECUs 11, 12 are connected to a communication line 3 in a vehicle to communicate with each other. For example, the ECU 11 may be an engine ECU for controlling an engine of the vehicle. The ECU 12 may be a power supply ECU for performing power supply control, including control for charging a battery mounted to the vehicle, control for supplying power to other parts, and the like.

The ECU 11 includes a microcomputer 21, a data-writable non-volatile memory 23 and a communication circuit 25 for communicating with other parts connected to the communication line 3. The data-writable non-volatile memory 23 may be an electrically erasable programmable read-only memory (EEPROM), flush memory, or the like.

The ECU 11 is connected with a sensor 27 and an actuator 29. The sensor 27 acquires information needed to control the engine. The actuator 29 is provided to control the engine. The sensor 27 may include a throttle opening degree sensor for detecting an opening degree of an electronic throttle, an accelerator pedal sensor for detecting an accelerator pedal pressing operation of the vehicle's driver, a brake pedal sensor for detecting a brake pedal pressing operation of the vehicle's driver, a crank shaft sensor for outputting a NE (number of engine revolution) signal representing the number of engine revolution, a pressure sensor for detecting an intake pipe pressure of the engine, or the like. The actuator 29 may include a throttle motor for changing the opening degree of the electronic throttle, an injector for fuel injection, a solenoid valve for an exhaust gas recirculation (EGR) system, or the like.

The microcomputer 21 of the ECU 11 controls the engine by driving the actuator 29 based on the information from the sensor 27. Like the ECU 11, the ECU 12 includes a microcomputer 31, a data-writable non-volatile memory 33, and a communication circuit 35.

The ECU 12 is connected with a sensor 37 and an actuator 39. The sensor 37 acquires information needed to perform the power supply control. The actuator 39 is provided to perform the power supply control. For example, the sensor 37 may include a battery temperature sensor for detecting temperature of the battery, a voltage sensor for detecting voltage of the battery, a sensor for outputting information used to determine whether or not a charged amount of the battery should increase, or the like. The actuator 39 may include a power feed relay for supplying a battery voltage to other parts, an electric generator, or the like.

A tool 41 is connectable to the communication line 3 with a connector 43. The tool 41 is an external apparatus for failure diagnosis, and is not mounted to the vehicle. The tool 41 also includes a microcomputer (not shown). The tool 41 is equipped with an input device such as a keyboard and the like, and a display for displaying information.

The data recorder 45 is connected with the communication line 3, as the ECUs 11, 12 is connected to the communication line 3. The data recorder 45 includes a microcomputer 51, a data-writable non-volatile memory 53, and a communication circuit 55 for communicating with other parts connected to the communication line 3. A storage area of the memory 53 is divided into at least two storage areas 53*a*, 53*b*. Information to be stored in each storage area 53*a*, 53*b* will be described later.

An information management center, which is a facility located external to the vehicle, is equipped with a processing apparatus 61 including a computer, a wireless communication device and the like. The data recorder 45 can communicate with the processing apparatus 61 by wireless communication for information exchange.

The data recorder 45 may be equipped with a wireless communication device, by which the microcomputer 51 of the data recorder 45 performs wireless communication with the processing apparatus 61. Alternatively, a wireless communication ECU equipped with the wireless communication device may be connected to the communication line 3, so that the microcomputer 51 of the data recorder 45 can perform wireless communication with the processing apparatus 61 through the communication line 3 and the wireless communication ECU. Thus, the wireless communication ECU can act as a relay unit for wireless communication between the data recorder 45 and the processing apparatus 61.

Figure 2:
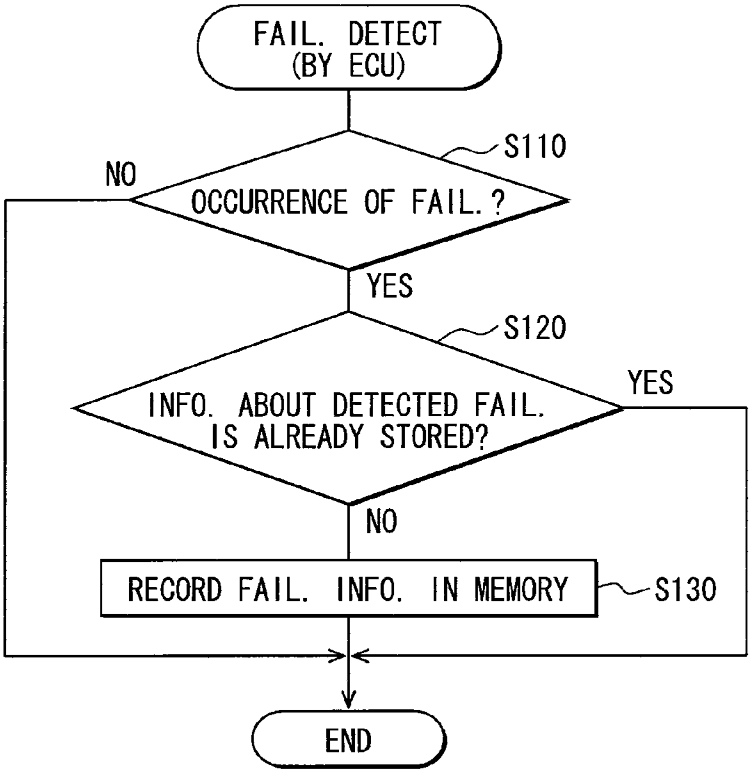
FIG. 2 is flowchart illustrating a failure detection process performed by an electronic control unit (ECU)

In the in-vehicle communication system 1, the microcomputer 21, 31 of each ECU 11, 12 is equipped with a failure detection function, which is also called "self-diagnosis function". To implement the failure detection function, the microcomputer 21, 31 of each ECU 11, 12 performs a failure detection process illustrated in FIG. 2 at, for example, regular time intervals. For each type of failure to be detected, the failure detection process illustrated in FIG. 2 is performed. In the following description, an own-ECU refers to the ECU 11, 12 including the microcomputer 21, 31.

As shown in FIG. 2, upon starting the failure detection process, the microcomputer 21, 31 of the ECU 11, 12 performs S110. At S110, the microcomputer 21, 31 determines whether or not a failure to be detected (also called a detection target failure) is occurring, by determining whether or not a failure detection condition for a detection target failure is satisfied. In the above, the failure detection condition for a detection target failure is a condition for determining that the detection target failure is occurring.

When it is determined that the detection target failure is not occurring, corresponding to NO at S110, the failure detection process is ended. When it is determined that the detection target failure is occurring, corresponding to YES at S110, the process proceeds to S120.

At S120, the microcomputer 21, 31 determines whether or not the failure information indicating occurrence of the failure detected this time is already stored in the memory 23, 33 of the own ECU. That is, it is determined whether or not the failure information about the failure that is occurring according to a result of determination at S110 is already stored in the memory 23, 33 of the own ECU. When the failure information is stored in the memory 23, 33, corresponding to YES at S120, the failure detection process is ended. When the failure information is not stored in the memory 23, 33, corresponding to NO at S120, the process proceeds to S130. At S130, in the memory 23, 33 of the own ECU, the microcomputer 21, 31 records the failure information about the failure detected this time. After S130, the failure detection process is ended.

The failures to be detected by the microcomputer 21 of the ECU 11 may include, for example, an electronic throttle abnormality, an accelerator pedal abnormality, a NE signal line abnormality, an engine misfire abnormality, an EGR abnormality or the like. The failures to be detected by the microcomputer 31 of the ECU 12 may include, for example, a battery temperature sensor abnormality, a voltage sensor abnormality, or the like (see FIG. 3).

The failure detection conditions for the above failures may be arbitrarily settable. For example, the failure detection conditions may be used.

(1) Failure Detection Condition for Electronic Throttle Abnormality

A difference between a control target opening degree of the electronic throttle and an actual opening degree of the electronic throttle detected based on a signal from the throttle opening degree sensor is larger than a predetermined value.

(2) Failure Detection Condition for Accelerator Pedal Abnormality

While a signal from a sensor other than the accelerator pedal sensor indicates that the accelerator pedal is never operated, a signal from the accelerator pedal sensor indicates that the accelerator pedal is pressed down.

(3) Failure Detection Condition for Brake Pedal Abnormality

While a signal from a sensor other than the brake pedal sensor indicates that the brake pedal is never operated, a signal from the brake pedal sensor indicates that the brake pedal is pressed down.

(4) Failure Detection Condition for NE Signal Line Abnormality

Level of the NE signal from the crank shaft sensor does not change for at least a predetermined period.

(5) Failure Detection Condition for Engine Misfire Abnormality

Rotation fluctuation of the crank shaft of the engine is larger than a misfire determination value.

(6) Failure Detection Condition for EGR Abnormality

An amount of change in intake pipe pressure at changeover of a solenoid valve of the EGR system is not a normal amount of change.

(7) Failure Detection Condition for Battery Temperature Sensor Abnormality

Voltage level of a signal from the battery temperature sensor is out of a normal range.

(8) Failure Detection Condition for Voltage Sensor Abnormality

Voltage level of a signal from the voltage sensor is out of a normal range.

In response to user's operation on the input device, the tool 41 sends a failure information request to the communication line 3. In response to the failure information request from the tool 41, the microcomputer 21, 31 of the ECU 11, 12 sends the failure information in the memory 23, 33 to the tool 41.

The microcomputer 51 of the data recorder 45 is equipped with an information collection function, a behavior detection function, a cause determination function, a control data recording function, and a control data output function. The information collection function collects multiple types of control data (i.e., control data in the vehicle) and information about failure detection results, which are retained in each ECU 11, 12, through the communication line 3 from ECU 11, 12. The behavior detection function detects a specific behavior of the vehicle, which is a behavior that can occur in conjunction with the driver's operation of the vehicle. In response to detection of the specific behavior by the behavior detection function, the cause determination function investigates a cause of occurrence of the specific behavior. In response to detection of the specific behavior by the behavior detection function, the control data recording function records the control data, which is collected by the information collection function, in the storage area 53*a* of the memory 53. In response to receipt of a data request from the tool 41, the control data output function outputs the information stored in the storage area 53*a* of the memory 53 to the tool 41 through the communication line 3.

The control data to be recorded in the storage area 53*a* of the memory 53 is such a control data of the vehicle as data about vehicle speed, opening degree of the throttle, the number of engine revolution etc., and may be a part of or all of the control data collected by the information collection function. The control data to be recorded in the storage area 53*a* of the memory 53 is also referred to herein as a record target control data. The record target control data read by the tool 41 is used to investigate a cause of occurrence of the detected behavior. Types of record target control data are predefined so as to cover a data relevant to the detected behavior as much as possible.

As illustrated in FIG. 3, the storage area 53*b* of the memory 53 of the data recorder 45 stores failure type information in a table form such that for each of multiple types of detection target behavior, one or more types of behavior-inducible failure, which is a failure that can be a cause of an occurrence of the detection target behavior, are stored.

Specifically, in order to provide the failure type information, types of behavior-inducible failure corresponding to each detection target behavior are investigated and identified. Then, the identified types of behavior-inducible failure are stored in the failure type information while being associated with the corresponding type of behavior. The number of types of behavior-inducible failure to be stored may not be constant over behaviors. Additionally, when the behavior-inducible failure corresponding to a certain behavior is absent or unknown, the type of behavior-inducible failure corresponding to the certain behavior may not be stored in the failure type information.

A latest one of the failure type information may be sent from the processing apparatus 61 of the information management center to the data recorder 45 by wireless communication, so that the failure type information is updated and stored in the storage area 53*b* of the memory 53. That is, upon receipt of the new failure type information from the processing apparatus 61 of the information management center, the microcomputer 51 overwrites the failure type information in the storage area 53*b* of the memory 53 with the new failure type information.

Next, a data recording process will be described with reference to FIG. 4. The data recording process is performed by the microcomputer 51 of the data recorder 45 in order to detect the specific behavior of the vehicle and record the control data in the storage area 53*a* of the memory 53.

Figure 4:
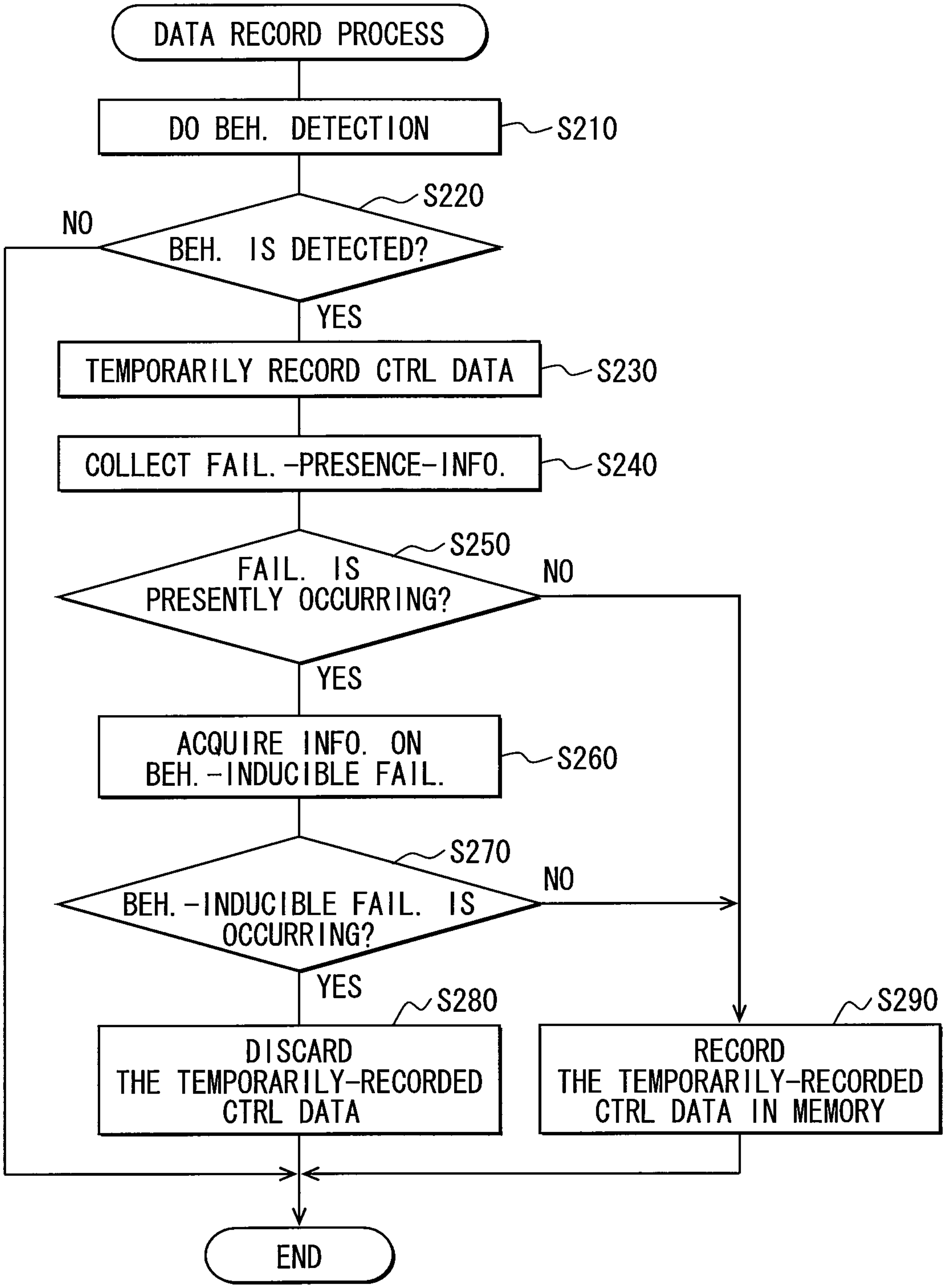
FIG. 4 is a flowchart illustrating a data recording process performed by a data recorder of a first embodiment.

For each detection target behavior, the data recording process illustrated in FIG. 4 is performed at, for example, regular time intervals. Further, independently of the data recording process, the microcomputer 51 performs a data collection process at, for example, regular time intervals. In the data collection process, the microcomputer 51 communicates with the ECUs 11, 12 to collect the control data.

As shown in FIG. 4, upon starting the data recording process, the microcomputer 51 of the data recorder 45 performs S210. At S210, the microcomputer 51 performs a behavior detection process to detect a detection target behavior. More specifically, based on various control data collected in the above-described data collection process (by the information collection function), the microcomputer 51 determines whether or not a predetermined behavior detection condition directed to the detection target behavior is satisfied. When it is determined that the behavior detection condition is satisfied, the microcomputer 51 determines the occurrence of the detection target behavior.

Let us consider examples. When a detection target behavior is "engine revolution number (NE) sudden increase" illustrated in FIG. 3, the behavior detection condition is that a rate of increase in NE exceeds a predetermined value. When the detection target behavior is "sudden vehicle acceleration", the behavior detection condition is that a rate of increase in vehicle speed in its heading direction (acceleration) exceeds a predetermined value. When the detection target behavior is "sudden vehicle deceleration", the behavior detection condition is that a rate of decrease in vehicle speed in its heading direction (deceleration) exceeds a predetermined value. When the detection target behavior is "pressing of both of the accelerator pedal and the brake pedal", the behavior detection condition is that both of the accelerator pedal and the brake pedal are pressed down.

At S220, the microcomputer 51 determines whether or not the detection target behavior is detected in the behavior detection process of S210. In other words, at S220, the microcomputer 51 determines whether or not the occurrence of the behavior is determined at S210. When the detection target behavior is not detected, corresponding to NO at S220, the data recording process is ended. When the detection target behavior is detected, corresponding to YES at S220, the process proceeds to S230.

At S230, the microcomputer 51 retrieves the record target control data from the control data collected at present time, and records the record target control data in the RAM 51*a* while associating the record target control data with information indicative of the type of behavior detected at S210 this time. This record target control data is temporarily recorded in the RAM 51*a*. The record target control data is stored in the RAM 51*a* until at least the end of the record processing process.

At S240, the microcomputer 51 collects failure presence-absence information from the ECUs 11, 12 via the communication line 3. Specifically, the microcomputer 51 collects the failure presence-absence information for each of the behavior-inducible failures described in the failure type information in the storage area 53*b* illustrated in FIG. 3. The failure presence-absence information is defined as information containing a type of failure and a result of the determination made at S110 of the failure detection process in FIG. 2 as to whether this type of failure is presently-occurring (i.e., whether the failure detection condition for the failure is presently satisfied). At S240, the microcomputer 51 may collect the failure presence-absence information for all of the failures to be detected by the ECUs 11, 12. Alternatively, from processing efficiency viewpoint, the microcomputer 51 may collect only the failure presence-absence information for each of the behavior-inducible failures described in the failure type information. Alternatively, in order to narrow down the information to be collected, the microcomputer 51 may collect only the failure presence-absence information for the behavior-including failure that is associated with the behavior detected at S210 this time.

At S250, the microcomputer 51 determines whether or not there is a presently-occurring failure, based on the failure-presence-absence information collected at S240. When there is the presently-occurring failure, corresponding to YES at S250, the process proceeds to S260. In the above, the presently-occurring failure refers to a failure that is presently occurring according to the result of the determination made at S110 in FIG. 2.

At S260, from the failure type information stored in the storage area 53*b*, the microcomputer 51 acquires type(s) of behavior-including failure that can be a cause of occurrence of the behavior detected at S210 this time. That is, the behavior-inducible failure(s) corresponding to the behavior detected at S210 is acquired from the failure type information (see FIG. 3). It should be noted that the failure type information may be stored not in the storage area 53*b* but in another apparatus (e.g., ECU 11, ECU 12) connected to the communication line 3. In this case, at S260, the microcomputer 51 may acquire necessary information from the another apparatus via the communication line 3.

At S270, the microcomputer 51 compares the type(s) of behavior-inducible failure acquired at S260 with the failure presence-absence information collected at S240. The microcomputer 51 thereby determines or not whether the presently-occurring failure is contained in the behavior-including failure(s) corresponding to the behavior detected at S210 this time. When the behavior-including failure(s) contains the presently-occurring failure, the microcomputer 51 determines that the behavior-including failure is presently occurring. In this case, the microcomputer 51 determines that the cause of the occurrence of the detected behavior is a failure that is presently occurring according to the determination made by the ECU 11, 12 and that is to be recorded as the failure information in the memory 23, 33 of the ECU 11, 12. Thereafter, the process proceeds to S280.

At S280, the microcomputer 51 discards the record target control data and the information indicative of the type of the detected behavior. That is, the microcomputer 51 discards the information that was recorded in the RAM 51*a* at S230. Thereafter, the behavior recording process is ended. Alternatively, at S280, of the information recorded in the RAM 51*a* at S230, the information indicative of the type of the detected behavior may not be discarded and may be stored in the storage area 53*a* of the memory 53.

When it is determined at S270 that (i) the behavior-inducible failure(s) corresponding to the behavior detected this time at n S210 does not contain the presently-occurring failure and (ii) the behavior-inducible failure(s) is not presently occurring, it is determined that the presently-occurring failure determined by the ECU 11, 12 is not a cause of occurrence of the behavior detected this time. In this case, the process proceeds to S290. When it is determined at S250 that there is no presently-occurring failure, it is determined that a cause of occurrence of the behavior detected this time is not a presently-occurring failure. In this case, the process proceeds to S290.

At S290, the information (the record target control data and the information indicative of the type of detected behavior) stored in the RAM 51*a* at S230 is recorded in the storage area 53*a* of the memory 53. Thereafter, the data recording process is ended.

As for the tool 41, in response to the user's operation on the input device, the tool 41 sends a data request to the communication line 3. Upon receipt of the data request from the tool 41, the microcomputer 51 of the data recorder 45 outputs the information stored in the storage area 53*a* of the memory 53 to the tool 41.

The above-described data recorder 45 can operate as follows. Upon detection of a specific behavior of the vehicle (YES at S220), the data recorder 45 records a record target control data at that time in the RAM 51*a* (S230) and determines whether or not there is a presently-occurring failure (S250). The presently-occurring failure is a failure that is presently occurring according to a result of the determination result made by the failure detection function of the ECU 11, 12. When there is the presently-occurring failure (YES at S250), the data recorder 45 determines whether or not there is the presently-occurring failure in a behavior-including failure (S260, S270). The presently-occurring failure is a failure that can be a cause of occurrence of the detected specific behavior.

When there is the presently-occurring failure in the behavior-including failure (NO at S270) or when there is no presently-occurring failure (NO at S250), it is determined that the presently-occurring failure is not the cause of occurrence of the detected specific behavior. In this case, the record target control data at the time of detection of the specific behavior stored in the RAM 51*a* is recorded in the storage area 53*a* of the memory 53 (S290). When there is the presently-occurring failure in the behavior-including failure (YES at S270), it is determined that the presently-occurring failure is the cause of occurrence of the detected specific behavior. In this case, the record target control data at the time of detection of the specific behavior stored in the RAM 51*a* is discarded so that this record target control data is prohibited from being recorded in the storage area 53*a* of the memory 53 (S280).

Figure 5:
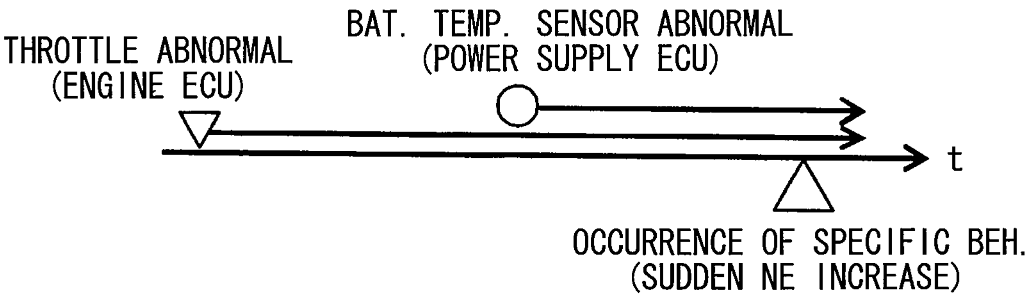
FIG. 5 is a diagram illustrating operation and effect of the first embodiment.

Now, a concrete example will be described with reference to FIG. 5, which illustrates the following situation. At a time denoted by down-pointing triangle, the ECU determines that the electronic throttle abnormality is occurring. At a time denoted by circle, the ECU 12 determines that the battery temperature sensor abnormality is occurring. At a time of up-pointing triangle, the data recorder 45 (more specifically, the microcomputer 51) detects a NE sudden increase behavior. In this example, at time of detecting the NE sudden increase, the data recorder 45 recognizes that the electronic throttle abnormality, which can be a cause of occurrence of the NE sudden increase (see FIG. 3), is occurring. Thus, the data recorder 45 determines that the electronic throttle abnormality is the cause of the occurrence of the NE sudden increase. As a result, the data recorder 45 does not record the record target control data in the memory 53.

In other words, in some cases, even if a detection target behavior is detected, it may be determined that the detected behavior results from the failure detected by the failure detection function of the ECU 11, 12. In this case, since a cause of occurrence of the behavior can be identified from the failure information stored in the memory 23, 33 of the ECU 11, 12, the record target control data is prohibited from being recorded in the memory 53.

Therefore, it becomes possible to prevent a practically-useless control data from being recorded in the storage area 53*a* of the memory 53, and it becomes possible to efficiently use the storage area 53*a*. In the above, the practically-useless control data is a control data at the time of detection of the behavior whose cause can be identified form the failure information that was recorded in the memory 23, 33 by the failure detection function (failure detection process) of the ECU 11, 12

Furthermore, upon detection of the specific behavior of the vehicle, the data recorder 45 of the present embodiment records the record target control data in the RAM 51*a* (S230). Then, when a permission to record the storing target control data in the memory 53 is established through S240 to S270 in FIG. 4 (i.e., the process proceeds to S290 from S250 or S270), the control target control data in the RAM 51*a* is recorded in the memory 53.

Therefore, even if it takes a relatively long time to perform S240 to S270, the storing target control data at a time immediately after the occurrence of the specific behavior can be recorded in the storage area 53*a* of the memory 53.

Furthermore, the data recorder 45 of the present embodiment updates the failure type information (FIG. 3) stored in the storage area 53*b* of the memory 53 by acquiring the failure type information from the processing apparatus 61 of the information management center by wireless communications.

Therefore, the failure type information, indicating which failure is the behavior-inducible failure corresponding to the detected behavior, can be easily corrected to reflect latest information. Thus, it is possible to prevent the failure type information from being old and incorrect, and it is possible to provide an appropriate result of determination as to whether to record the record target control data in the memory 53.

In the present embodiment, the microcomputer 21, 31 of the ECU 11, 12 (in particular the microcomputer 21, 31) performing the failure detection process in FIG. 2, can correspond to a failure detector, a failure detection device or means. The memory 23, 33 of the ECU 11, 12 can correspond to a failure information storage unit or means.

The storage area 53*a* of the memory 53 of the data recorder 45 can correspond to a data storage device or means, which may be a non-volatile data storage device or means. The storage area 53*b* of the memory 53 of the data recorder 45 can correspond to a predetermined storage area. The RAM 51*a* can correspond to a temporary data memory, a temporary data storage means or device. In the present example embodiment, the microcomputer 51 performing S210 in FIG. 4 corresponds to a behavior detection device or means. In the present example embodiment, the microcomputer 51 performing S230 and S290 corresponds to a record processing device or means. In the present example embodiment, the microcomputer 51 performing S240 and S270 corresponds to a cause determination device or means. The processing apparatus 61 of the information management center can correspond to an external apparatus external to a vehicle.

Second Embodiment

A second embodiment will be described. Like references are used to refer to like parts between the first embodiment and the second embodiment.

Figure 6:
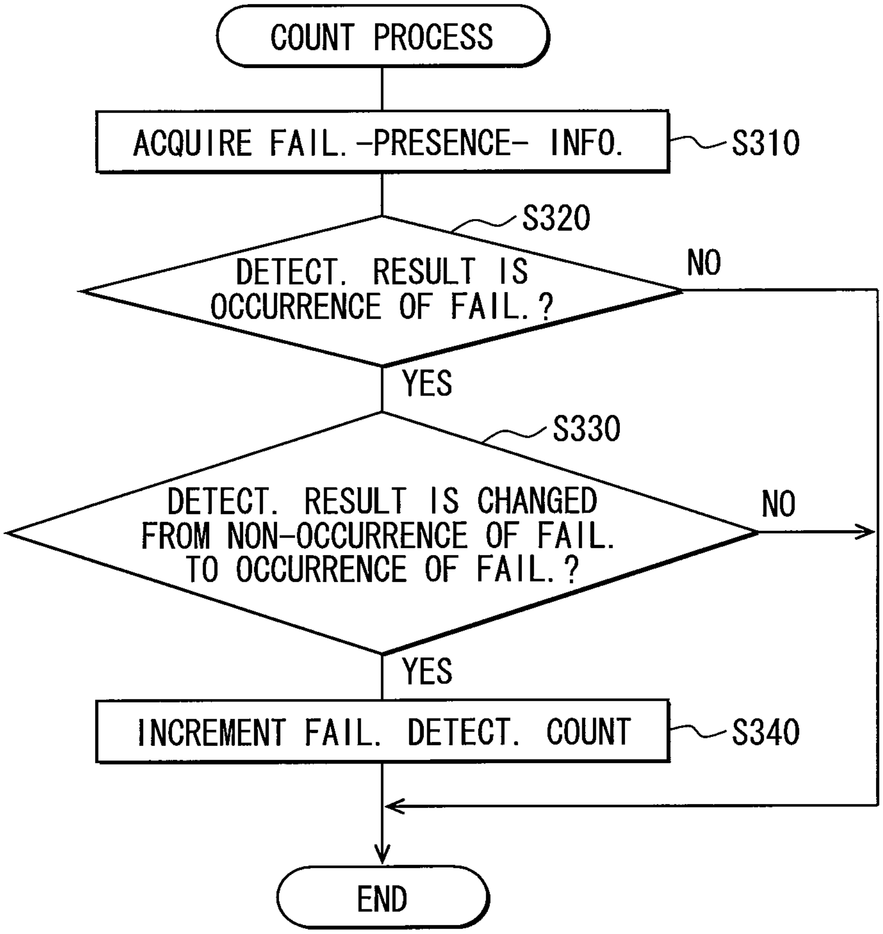
FIG. 6 is a flowchart illustrating a counting process performed by a data recorder of a second embodiment.
Figure 7:
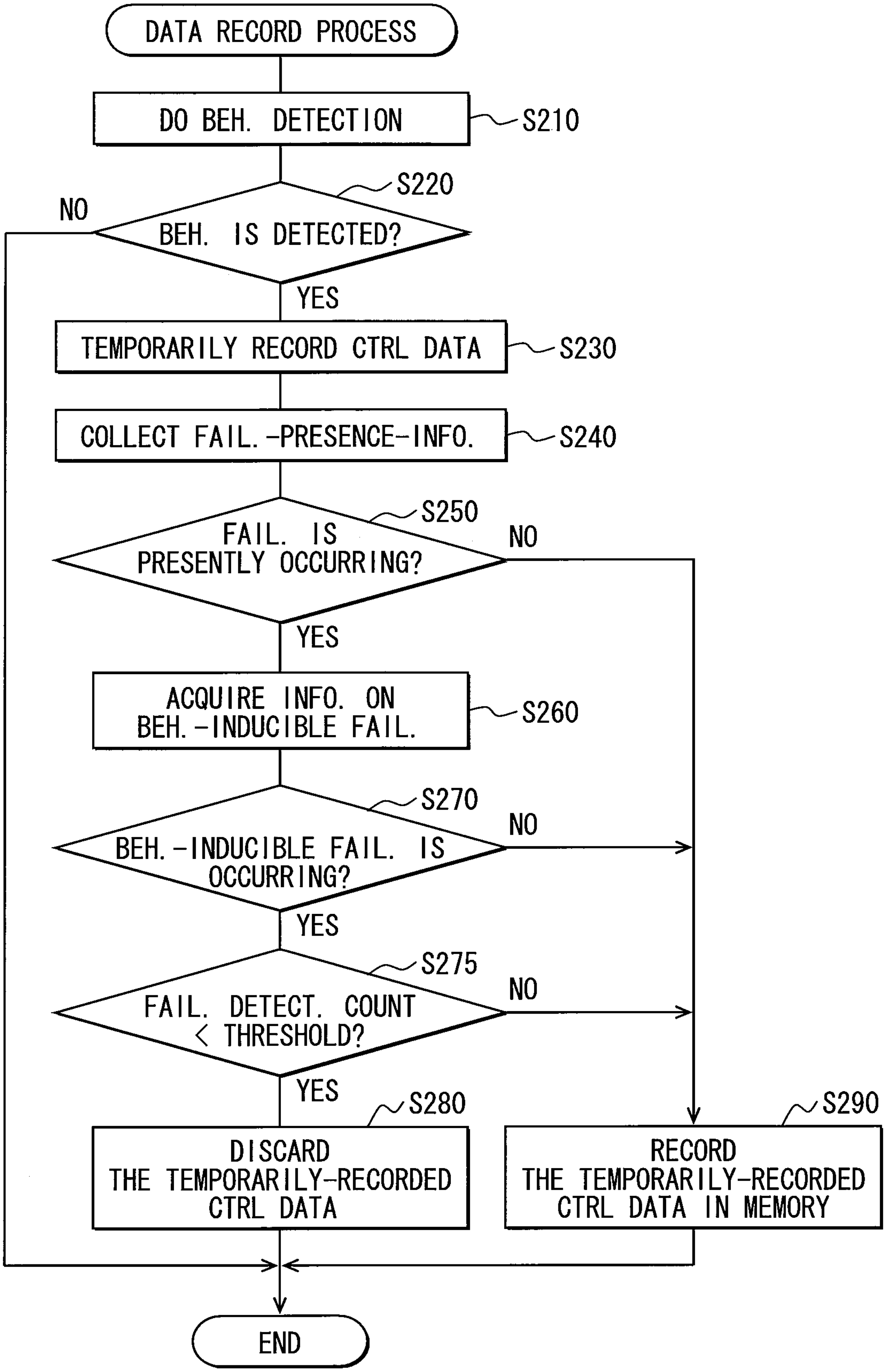
FIG. 7 is a flowchart illustrating a data recording process performed by a data recorder of the second embodiment.
Figure 8:
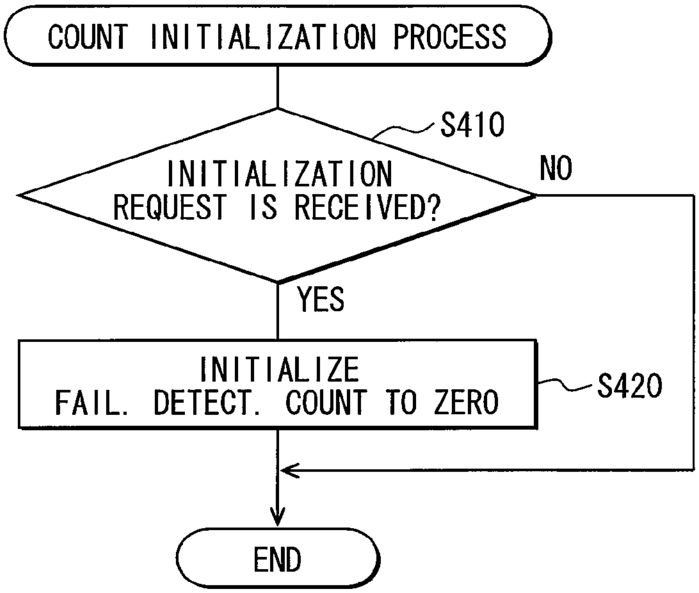
FIG. 8 is a flowchart illustrating a failure detection count initialization process performed by the data recorder of the second embodiment.

The second embodiment differs from the first embodiment in that the microcomputer 51 of the second embodiment performs a process in FIG. 7 in place of the process in FIG. 4, and further performs processes in FIGS. 6 and 8. The processes will be specifically described below.

FIG. 6 is a flowchart illustrating a counting process. The counting process is preformed for each of processing target failures, which are the behavior-inducible failures described in the failure type information in the storage area 53*b* illustrated in FIG. 3. It should be noted that the behavior-inducible failures described in the failure type information may be a part of the vehicle failures to be detected by the ECU 11, 12. This counting process may be preformed at predetermined time intervals in order to count the failure detected by the ECU 11, 12. Specifically, the counting process counts the number of times the occurrence of the failure is determined in the failure detection process in FIG. 2. More specifically, the counting process counts the number of times a result of the determination at S110 is changed from NO (corresponding to an un-occurrence of the failure and non-satisfaction of the failure detection condition) to YES (occurrence of the failure and satisfaction of the failure detection condition). Therefore, the counting process provides a detection count of the processing target failure.

As shown in FIG. 6, upon starting the counting process, the microcomputer 51 of the data recorder 45 performs S310. At S310, the microcomputer 51 collects the failure presence-absence information for the processing target failure from the ECU 11, 12 via the communication line 3.

At S320, based on the failure presence-absence information collected at S310, the microcomputer 51 checks a failure detection result, which is the last result of determination made at S110 of the failure detection process in FIG. 2 as to the processing target failure. When the failure detection result indicates non-occurrence of the failure (non-satisfaction of the failure detection condition), corresponding to NO at S320, the counting process is ended. When the failure detection result indicates occurrence of the failure (satisfaction of the failure detection condition), corresponding to YES at S320, the process proceeds to S330.

At S330, as to the processing target failure, the microcomputer 51 determines whether or not the failure detection result checked at S320 previous time was the un-occurrence of the failure (non-satisfaction of the failure detection condition). In other words, the microcomputer 51 determines whether or not the failure detection result is changed from the non-occurrence of the failure (non-satisfaction of the failure detection condition) to the occurrence of the failure (satisfaction of the failure detection condition) in this time.

When the failure detection result is not changed, corresponding to NO at S330, the counting process is ended. When the failure detection result is change into the occurrence of the failure (satisfaction of the failure detection condition), corresponding to YES at S330, the process proceeds to S340.

A data of the detection count given at S340 is stored in, for example, a predetermined storage area of the memory 53 other than the storage areas 53*a*, 53*b*.

FIG. 7 is a flowchart illustrating a data recording process that is performed in place of the process illustrated in FIG. 4. In the data recording process, a data at a time of behavior detection can be recorded. The data recording process in FIG. 7 differs from that in FIG. 4 in that S275 is added.

Specifically, according to the data processing process in FIG. 7, when it is determined that the behavior-inducible failure(s) corresponding to the behavior detected at S210 this time contains the presently-occurring failure, corresponding to YES at S270, the process proceeds to S275 instead of S280.

At S275, the microcomputer 51 reads out the detection count of a relevant failure, which is counted in the counting process of FIG. 6. The relevant failure refers to the presently-occurring behavior contained in the behavior-inducible failure(s), which corresponds to the behavior detected at S210 this time. Additionally, the microcomputer 51 determines whether or not the read detection count of the relevant failure is less than the predetermined value. When the read detection count of the relevant failure is less than the predetermined value, corresponding to YES at S275, it is determined that the relevant failure is a cause of occurrence of the behavior detected this time and that the information about the relevant failure was already recorded in the memory 23, 33 of the ECU 11, 12. In this case, the process proceeds to S280. When the detection count of the relevant failure is, greater than or equal to the predetermined value, corresponding to NO at S275, it is determined that the relevant failure is not the cause of occurrence of the behavior detected this time.

At S275, there may be multiple relevant failures. In this case, for each relevant failure, it is determined whether the detection count of the relevant failure is less than the predetermined value. When at least one detection count is less than the predetermined value, the process proceeds to S280. When all of the detection counts are greater than or equal to the predetermined value, the process proceeds to S290.

A failure detection count initialization process illustrated in FIG. 8 will be described. The failure detection count initialization process is provided to initialize the detection count to zero. The failure detection count initialization process is performed at, for example, regular time intervals.

As shown in FIG. 8, upon starting the failure detection count initialization process, the microcomputer 51 of the data recorder 45 performs S410. At S410, it is determined whether or not the microcomputer 51 has received an initialization request from the tool 41 connected to the communication line 3. When the microcomputer 51 has not received the initialization request, corresponding to NO at S410, the failure detection count initialization process is ended. When the microcomputer 51 has received the initialization request, corresponding to YES at S410, the process proceeds to S420.

The initialization request may be a command requesting initialization of the failure detection count, and contains information indicating for which type of failure the failure detection count should be initialized (i.e., which failure detection count should be initialized).

The initialization request may be a dedicated command. Alternatively, a failure information delete request sent from the tool 41 to the ECU 11, 12 also plays a role of the initialization request. In the present embodiment, the latter is employed. The failure information delete request contains the information indicating for which type of failure the failure detection count should be initialized (i.e., which failure detection count should be initialized). In response to the user's operation on the input operation device, the tool 41 sends the failure information delete request to the communication line 3. Upon receipt of the failure information delete request from the tool 41, the microcomputer 21, 31 of the ECU 11, 12 deletes, from the memory 23, 33, the failure information about the failure indicated by the failure information delete request.

Explanation returns to FIG. 8. At S420, the failure detection count corresponding to the initialization request (the failure information delete request) received from the tool 41 is initialized to zero. Then, the failure detection count initialization process is ended.

The data recorder 45 of the second embodiment can operate as follows. Even if it is determined that the behavior-inducible failure, which is a failure that can be a cause of occurrence of the detected behavior, is contained in the presently-occurring behavior (YES at S270), it is not simply determined that the presently-occurring failure is a cause of occurrence of the detected behavior. In stead, the detection count of the presently-occurring failure in the behavior-inducible failure is checked (S275). When the detection count is less than the predetermined value N (YES at S275), it is determined that the presently-occurring failure (the behavior-inducible failure whose detection count is less than the predetermined value N) is the cause of occurrence of the detected behavior. Additionally, the record target control data that was recorded in the RAM 51*a* at the time of detection of the behavior is discarded, so that this record target control data is not recorded in the memory 53 (S280). To put it the other way, even when the behavior-inducible failure is included in the presently-occurring behavior (YES at S270), as long as the detection count of the behavior-inducible failure is greater than or equal to the predetermined value N, it is determined that the behavior-inducible failure is not a cause of occurrence of the detected behavior.

Figure 9:
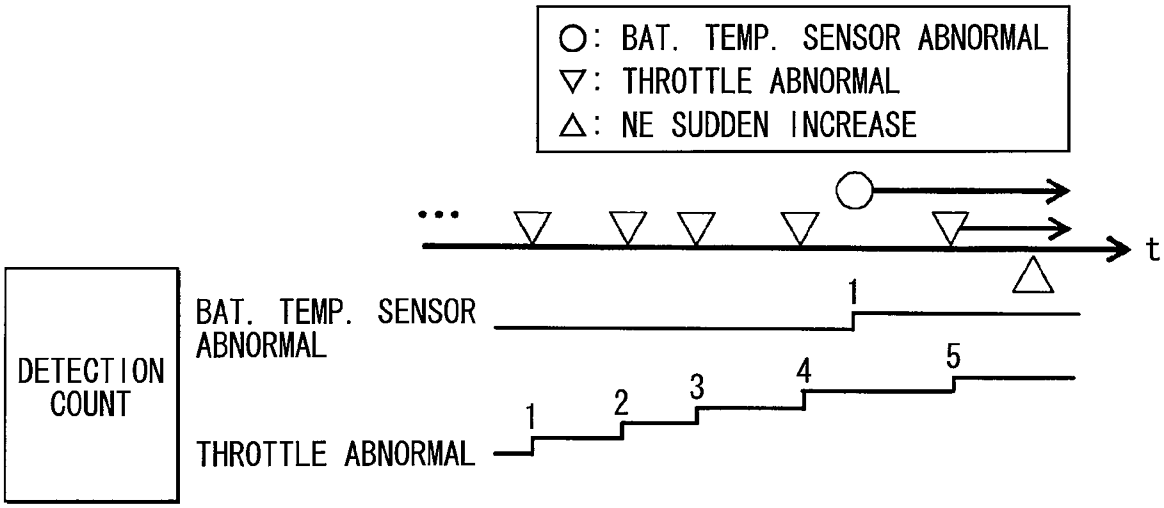
FIG. 9 is a diagram illustrating operation and effect of the second embodiment.

Let us consider a concrete example with reference to FIG. 9, which illustrates the following situation. At each time denoted down-pointing triangle, a result of failure detection of the electronic throttle abnormality by the ECU 11 is changed from occurrence of the failure to non-occurrence of the failure. At a time denoted by circle, a result of failure detection of the battery temperature sensor abnormality by the ECU 12 is changed from a non-occurrence of the failure to an occurrence of the failure. The predetermined value N used at S275 of FIG. 7 is assumed to be 5.

In this example, at a time of detecting the NE sudden increase, the data recorder 45 recognizes that the electronic throttle abnormally is presently occurring as a behavior-inducible failure of the NE sudden increase (see FIG. 3 and YES at S270). However, because the detection count of the electronic throttle abnormality is less than the predetermined value N=5 (NO at S275), it is determined that the electronic throttle abnormality is not a cause of occurrence of the NE sudden increase. Additionally, at the time of detecting the NE sudden increase, the battery temperature sensor abnormality is also occurring, and the detection count of the battery temperature sensor abnormality is 1<N. However, since the battery temperature sensor abnormality is not stored as the behavior-inducible failure of the NE sudden increase in the failure type information (see FIG. 3), the data recorder 45 is prohibited from determining that the battery temperature sensor abnormality is a cause of occurrence of the NE sudden increase. Therefore, the data recorder 45 records the record target control data in the memory 53 without determining that any one of the electronic throttle abnormality and the battery temperature abnormality, each of which is the presently-occurring failure, is a cause of occurrence of the NE sudden increase.

As described above, depending on a degree or state of an occurring abnormality, the behavior-inducible failure does not lead to an occurrence of a detection target behavior in some cases. Specifically, an aged deterioration of the electronic throttle or an environmental condition such as weather condition or the like may prompt the ECU 11 to determine that the failure is occurring. Thus, in some cases, even if the electronic throttle is on a threshold of failure, the electronic throttle may fail to cause the NE sudden increase although the ECU 11 may determine that the electronic throttle has a failure depending on the failure detection condition.

In view of the above, the data recorder 45 of the second embodiment is configured to operate as follows. Even when there is the presently-occurring failure in the behavior-inducible failure of the detected behavior, as long as the detection count of the behavior-inducible failure is greater than or equal to the predetermined value N, the data recorder 45 determines that the behavior-inducible failure is not a cause of occurrence of the detected behavior. This is because if the behavior-inducible failure were a cause of occurrence of the behavior detected this time, the same behavior should have been detected before this time detection of the behavior-inducible failure. Specifically, the same behavior should have been detected at a time when the detection count of the behavior-inducible failure is less than the predetermined value.

Therefore, according to the data recorder 45 of the second embodiment, it is possible to more accurately determine whether or not the presently-occurring failure is a cause of occurrence of the detected behavior, and contently, it is possible to more accurately determine whether to record the record target control data.

Furthermore, according to the data recorder 45 of the second embodiment, because of the failure detection count initialization process of FIG. 8, it is possible to delete the failure information and initialize the detection count of failure to zero in, for example, the following situation. Devices (vehicle parts) to be diagnosed by the ECU 11, 12 include a certain device that can cause a detection target behavior when having a failure. This certain device is replaced with a new device.

A failure of the new device may cause occurrence and detection of the detection target behavior. Even in this case, if the failure detection count is initialized at a time of device replacement, a wrong determination that the failure of the new device is not a cause of occurrence of the detected behavior is prevented. Additionally, it is possible to prevent the practically-useless record target control data from being recorded in the memory 53. If the failure detection count before the device replacement remains uninitialized and is greater than or equal to the predetermined value N, the above-described wrong determination is made.

In the present embodiment, the microcomputer 51 performing S240 to S275 in FIG. 7 and the counting process in FIG. 6 can correspond to a cause determination device or means. The counting process in FIG. 6 can also correspond to a counter, or a counting device or means.

Embodiments are not limited to the above-described embodiments. Examples of other embodiments will be described.

For example, the number of ECUs connected to the communication line 3 and configured to perform the failure detection process is not limited to two, and may be one or more than two. Types of ECU are not limited to the engine ECU or power supply ECU, and may be ECUs for performing other controls.

The detection target behaviors and the failure types are not limited to the above-described examples, and may be other detection target behaviors and failure types.

The type of record target control data to be recorded may differ from detection target behavior to detection target behavior, or may be the same between detection target behaviors.

A storage for storing the record target control data, which can correspond to a non-volatile data storage device or device, is not limited to a non-volatile memory such as a EEPROM, a flush memory, and may be a card-type or disk-type storage medium or a storage device such as a hard disk drive and the like.

The failure type information may be stored in a storage medium other than the memory 53. At S130 of FIG. 2, the ECU may further record a predetermined control data at that time in the memory 23, 33.

Any one of ECUs mounted to the vehicle and configured to perform a failure detection process may be configured as the data recorder 45. For example, in the case of FIG. 1, one of or both of the ECUs 11 and 12 may be provided with the functions of the data recorder 45. In this configuration, the hardware sharing by the ECU and the data recorder can reduce cost.

The present disclosure has various aspects. For example, according to one aspect, a data recorder mounted to a vehicle together with a failure detector is provided. The failure detector is configured to (i) make, for multiple types of failure, a determination of whether or not a failure is occurring, and (ii) record failure information indicating an occurrence of the failure in a failure information storage unit upon determining that the failure is occurring. The data recorder comprises a behavior detection device, a record processing device, and a cause determination device. The behavior detection device detects a specific behavior of the vehicle. The specific behavior is defined as a behavior that can occur in conjunction with a driver's operation of the vehicle. The record processing device records a predetermined control data of the vehicle in a non-volatile data storage device when the behavior detection device detects the specific behavior of the vehicle. The cause determination device determines, in response to detection of the specific behavior by the behavior detection device, whether or not a presently-occurring failure is a cause of occurrence of the specific behavior. The presently-occurring failure is the failure that is occurring according to a result of the determination made by the failure detector. When the cause determination device determines that the presently-occurring failure is not the cause of occurrence of the specific behavior, the record processing device is permitted to record the control data in the non-volatile data storage device. When the cause determination device determines that the presently-occurring failure is the cause of occurrence of the specific behavior, the record processing device is prohibited from recording the control data in the non-volatile data storage device.

According to the above data recorder, when the specific behavior occurs due to the failure detected by the failure detector and is detected by the behavior detection device, the cause determination device can determine that the presently-occurring failure is the cause of the occurrence of the specific behavior. Additionally, it is possible to prohibit the control data from being recorded in the data storage device.

Therefore, it becomes possible to prevent a practically-useless control data from being recorded in the data storage device, and it becomes possible to efficiently use a storage area of the data storage device. In the above, the practically-useless control data is a control data at the time of detection of the specific behavior whose cause can be identified from the failure information recorded in the failure information storage unit.

The above data recorder may be configured as follows. In response to the detection of the specific behavior by the behavior detection device, the cause determination device determines whether or not the presently-occurring failure contains a behavior-inducible failure. The behavior-inducible failure is a failure that can cause occurrence of the specific behavior. When the presently-occurring failure contains the behavior-inducible failure, the cause determination device determines that the presently-occurring failure is the cause of occurrence of the specific behavior.

According to the above configuration, at the time of the detection of the specific behavior, the data recorder can investigate type of the presently-occurring failure and determine whether or not the presently-occurring failure contains the behavior-inducible failure (whether, of the multiple types of failure to be detected by the failure detector, the behavior-inducible failure that can be a cause of the occurrence of the specific behavior detected this time is presently occurring). By only doing the above, the data recorder can determine whether or not the presently-occurring failure is the cause of occurrence of the specific behavior detected this time, and consequently, can determine whether to record the control data.

The above data recorder may be configured as follows. The cause determination device includes a counter configured to count the behavior-inducible failure detected by the failure detector, thereby providing a detection count of the behavior-inducible failure. Upon determining that the presently-occurring failure contains the behavior-inducible failure, the cause determination device determines whether or not the detection count of the behavior-inducible failure contained in the presently-occurring failure is smaller than a predetermined value, in order to determine whether or not the presently-occurring failure is the cause of occurrence of the specific behavior. When the detection count of the behavior-inducible failure contained in the presently-occurring failure is smaller than the predetermined value, the cause determination device determines that the behavior-inducible failure contained in the presently-occurring failure is the cause of occurrence of the specific behavior. To put it the other way, even when the behavior-inducible failure is contained in the presently-occurring behavior, as long as the detection count of the behavior-inducible failure is greater than or equal to the predetermined value, the cause determination device is prohibited from determining that the behavior-inducible failure is the cause of occurrence of the detected behavior.

In some cases, the behavior-inducible failure may not lead to the occurrence of the specific behavior, depending on degree or state of an occurring abnormality. For example, an aged deterioration of a certain in-vehicle apparatus or an environmental condition such as weather condition or the like may prompt the failure detector to determine that a failure is occurring. Thus, in some cases, even when the failure detector determines that the certain apparatus has a failure, the specific behavior may no be actually occurring.

In view of the above possible situations, the above-described data recorder can operate as follows. Even when the presently-occurring failure(s) contains a behavior-inducible failure, as long as the detection count of the behavior-inducible failure is greater than or equal to the predetermined value, the data recorder determines that the behavior-inducible failure is not a cause of occurrence of the detected specific behavior. If the behavior-inducible failure were a cause of occurrence of the behavior detected this time, the same behavior should have been detected prior to this time detection of the behavior. That is, the same behavior should have been detected at a time when the detection count of the behavior-inducible failure was less than the predetermined value. More specifically, even though the behavior-inducible failure was detected many times (the predetermined value), the specific behavior has not been detected yet. Thus, the data recorder can determine that the behavior-inducible failure is not the cause of this time occurrence of the specific behavior, when the detection count of the behavior-inducible failure is greater than or equal to the predetermined value.

Therefore, according to the above data recorder, it is possible to more accurately determine whether or not the presently-occurring failure is a cause of occurrence of the specific behavior detected this time, and consequently, it is possible to more accurately determine whether or not to record the record target control data.

The above data recorder may be configured as follows. The detection count, which is provided by the counter, is initialized to zero upon receipt of an initialization request transmitted from an external of the data recorder.

According to this configuration, the detection count of the behavior-inducible failure counted by the counter can be initialized to zero at arbitrary time. Because of this, when apparatuses (vehicle parts) to be diagnosed by the failure detector include a certain apparatus that can cause the specific behavior when having a failure, and when the certain apparatus is replaced with a new one, the detection count of failure for the certain apparatus can be initialized to zero.

The new apparatus may have a failure that causes occurrence and detection of the specific behavior. Even in this case, if the detection count is initialized at a time of apparatus replacement, a wrong determination that the failure of the new apparatus is not the cause of this time occurrence of the specific behavior can be prevented. Additionally, it is possible to prevent the practically-useless control data from being recorded. If the failure detection count before the apparatus replacement remains uninitialized and is greater than or equal to the predetermined value, the above-described wrong determination is made.

A dedicated command may be used for a detection count initialization request. Alternatively, a failure information delete request for requesting the failure detector to delete the failure information may be used to also play a role of the initialization request. This advantageously enables the deletion of the failure information about the behavior-inducible failure and the initialization of the detection count of the behavior-inducible failure to zero.

The above data recorder may be configured as follows. The data recorder acquires failure type information from an external of the data recorder by wireless communication and records the acquired failure type information in a predetermined storage area. The failure type information indicates which type of failure is the behavior-including failure. The cause determination device identifies the behavior-inducible failure based on the failure type information stored in the storage area.

According to this configuration, the failure type information indicating which failure is the behavior-inducible failure can be constantly updated into latest one. Thus, it is becomes possible to easily prevent the cause determination device from making a wrong determination.

If the behavior-inducible failure is misused (i.e., if the failure not causing the occurrence of the specific behavior is misused as the behavior-inducible failure), the cause determination device may make a wrong determination as to whether or not the presently-occurring failure is the cause of occurrence of the specific behavior, and consequently, the cause determination device may make a wrong determine as to whether or not the control data should be recorded. However, the update of the failure type information can prevent the cause determination device from making a wrong determination.

For example, it is conceivable that the following situation may arise. although a certain failure is considered as the behavior inducible failure at a time of production of the data recorder, later investigation or analysis shows that a failure other than the certain failure is the behavior inducible failure. Even in this situation, by updating the failure type information by wireless communicating with an external apparatus external to the vehicle, it is possible to prevent the above-described wrong determination.

The above data recorder may be configured as follows. In response to the detection of the specific behavior by the behavior detection device, the record processing device records the control data in a temporary data memory other than the non-volatile data storage device. When the record processing device is permitted to record the control data in the non-volatile data storage device, the control data in the temporary data memory is recorded in the non-volatile data storage device by the record processing device.

According to this configuration, even if it takes a relative long time from the detection of the specific behavior to the end of the cause determination device's determination (eventually the end of the determination as to whether the control data should be recorded), the control data at a time immediately after the occurrence of the specific behavior can be recorded in the data storage device. That is, the control data at a minimum time later than the occurrence of the specific behavior can be stored.

The above data recorder may be equipped in an electronic control unit that includes the failure detector. According to this configuration, cost reduction can be achieved by hardware sharing with the electronic control unit.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A data recorder mounted to a vehicle to which a failure detector is mounted, the failure detector being configured to (i) make, for multiple types of failure, a determination of whether or not a failure is occurring, and (ii) record failure information indicating an occurrence of the failure in a non-volatile failure information storage unit upon determining that the failure is occurring, the data recorder comprising:

- a behavior detection device that detects a specific behavior of the vehicle, the specific behavior being defined as a behavior that can occur in conjunction with a driver's operation of the vehicle;
- a record processing device that records a predetermined control data of the vehicle in a non-volatile data storage device when the behavior detection device detects the specific behavior of the vehicle; and
- a cause determination device that:
  - determines, in response to detection of the specific behavior by the behavior detection device, whether or not there is a presently-occurring failure, wherein the presently-occurring failure is the failure that is determined as occurring by the failure detector and that is recorded as the failure information in the non-volatile failure information storage unit by the failure detector; and
  - when there is the presently-occurring failure, determines whether or not the presently-occurring failure is a cause of occurrence of the specific behavior by acquiring behavior-inducible failures from prestored failure type information and determining whether or not the presently-occurring failure is included in the behavior-inducible failures, wherein the behavior-inducible failures are prestored in the failure type information as predetermined failures that can cause the specific behavior; and wherein:

- when the cause determination device determines that the presently-occurring failure, which is recorded as the failure information in the non-volatile failure information storage unit, is not the cause of occurrence of the specific behavior, the record processing device is permitted to record the control data in the non-volatile data storage device; and
- when the cause determination device determines that the presently-occurring failure, which is recorded as the failure information in the non-volatile failure information storage unit, is the cause of occurrence of the specific behavior, the record processing device is prohibited from recording the control data in the non-volatile data storage device.

2. The data recorder according to claim 1, wherein:
the cause determination device includes
a counter configured to count the behavior-inducible failure detected by the failure detector, thereby providing a detection count of the behavior-inducible failure;
upon determining that the behavior-inducible failure is contained in the presently-occurring failure,
the cause determination device determines whether or not the detection count of the behavior-inducible failure contained in the presently-occurring failure is smaller than a predetermined value, in order to determine whether or not the presently-occurring failure is the cause of occurrence of the specific behavior; and
when the detection count of the behavior-inducible failure contained in the presently-occurring failure is smaller than the predetermined value, the cause determination device determines that the behavior-inducible failure contained in the presently-occurring failure is the cause of occurrence of the specific behavior.

3. The data recorder according to claim 2, wherein:
the detection count, which is provided by the counter, is initialized to zero upon receipt of an initialization request transmitted from an external of the data recorder.

4. The data recorder according to claim 1, wherein:
the data recorder acquires failure type information, which indicates which type of failure is the behavior-including failure, from an external of the data recorder by wireless communication and records the acquired failure type information in a predetermined storage area; and
the cause determination device identifies the behavior-inducible failure based on the failure type information stored in the storage area.

5. The data recorder according to claim 1, wherein:
in response to the detection of the specific behavior by the behavior detection device, the record processing device records the control data in a temporary data memory other than the non-volatile data storage device; and
when the record processing device is permitted to record the control data in the non-volatile data storage device, the control data in the temporary data memory is recorded in the non-volatile data storage device by the record processing device.

6. The data recorder according to claim 1, wherein the data recorder is equipped in an electronic control unit that includes the failure detector.

7. The data recorder according to claim 1, wherein:
when the cause determination device determines that the presently-occurring failure, which is recorded as the failure information in the non-volatile failure information storage unit by the failure detector, is the cause of occurrence of the specific behavior, the record processing device discards the control data without recoding the control data in the non-volatile data storage device.

8. A data recorder mountable to a vehicle to which a failure detector is mountable, the failure detector being configured to (i) make, for multiple types of failure, a determination of whether or not a failure is occurring, and (ii) record failure information indicating an occurrence of the failure in a non-volatile failure information storage unit upon determining that the failure is occurring, the data recorder comprising:
a behavior detector configured to detect a specific behavior of the vehicle, the specific behavior being defined as a behavior that can occur in conjunction with a driver's operation of the vehicle;
a record processor configured to record a predetermined control data of the vehicle in a non-volatile data storage device when the behavior detector detects the specific behavior of the vehicle; and
a computer configured to:
determine, in response to detection of the specific behavior by the behavior detector, whether or not there is a presently-occurring failure, wherein the presently-occurring failure is the failure that is determined as occurring by the failure detector and that is recorded as the failure information in the non-volatile failure information storage unit by the failure detector; and
when there is the presently-occurring failure, determine whether or not the presently-occurring failure is a cause of occurrence of the specific behavior by acquiring behavior-inducible failures from prestored failure type information and determine whether or not the presently-occurring failure is included in the behavior-inducible failures, wherein the behavior-inducible failures are prestored in the failure type information as predetermined failures that can cause the specific behavior; wherein
when the computer determines that the presently-occurring failure, which is recorded as the failure information in the non-volatile failure information storage unit, is not the cause of occurrence of the specific behavior, the record processor is permitted to record the control data in the non-volatile data storage device; and
when the computer determines that the presently-occurring failure, which is recorded as the failure information in the non-volatile failure information storage unit, is the cause of occurrence of the specific behavior, the record processor is prohibited from recording the control data in the non-volatile data storage device.

9. The data recorder according to claim 8, wherein:
the computer is further configured to:
count the behavior-inducible failure detected by the failure detector, thereby providing a detection count of the behavior-inducible failure;
upon determining that the behavior-inducible failure is contained in the presently-occurring failure, determine whether or not the detection count of the behavior-inducible failure contained in the presently-occurring failure is smaller than a predetermined value, in order to determine whether or not the presently-occurring failure is the cause of occurrence of the specific behavior; and
when the detection count of the behavior-inducible failure contained in the presently-occurring failure is smaller than the predetermined value, determine that the behavior-inducible failure contained in the presently-occurring failure is the cause of occurrence of the specific behavior.

10. The data recorder according to claim 9, wherein:
the detection count is initialized to zero upon receipt of an initialization request transmitted from an external of the data recorder.

11. The data recorder according to claim 8, wherein:
the data recorder is configured to acquire failure type information, which indicates which type of failure is the behavior-including failure, from an external of the data recorder by wireless communication and record the acquired failure type information in a predetermined storage area; and
the computer is further configured to identify the behavior-inducible failure based on the failure type information stored in the storage area.

12. The data recorder according to claim 8, wherein:

in response to the detection of the specific behavior by the behavior detector, the record processor records the control data in a temporary data memory other than the non-volatile data storage device; and when the record processor is permitted to record the control data in the non-volatile data storage device, the control data in the temporary data memory is recorded in the non-volatile data storage device by the record processor.

13. The data recorder according to claim 8, wherein the data recorder is equipped in an electronic control unit that includes the failure detector.

14. The data recorder according to claim 8, wherein:

the record processor is configured to, when the controller determines that the presently-occurring failure, which is recorded as the failure information in the non-volatile failure information storage unit by the failure detector, is the cause of occurrence of the specific behavior, discard the control data without recoding the control data in the non-volatile data storage device.

* * * * *